(12) United States Patent
Tunstall

(10) Patent No.: US 6,240,181 B1
(45) Date of Patent: May 29, 2001

(54) REMOTELY CONTROLLED SPEAKER PHONE

(76) Inventor: Tony Tunstall, 2378 Charleston Ter., Decatur, GA (US) 30034

( * ) Notice: Subject to any disclaimer, the term of this patent is extended or adjusted under 35 U.S.C. 154(b) by 0 days.

(21) Appl. No.: 09/335,670

(22) Filed: Jun. 18, 1999

(51) Int. Cl.⁷ ..................................................... H04M 1/00
(52) U.S. Cl. ............................................ 379/428; 379/420
(58) Field of Search .................................. 379/420, 428, 379/433, 447

(56) References Cited

U.S. PATENT DOCUMENTS

| | | | |
|---|---|---|---|
| 5,224,153 | 6/1993 | Katz | 379/93 |
| 5,228,075 | 7/1993 | La et al. | 379/67 |
| 5,465,401 * | 11/1995 | Thompson | 379/420 |
| 5,566,229 | 10/1996 | Hou et al. | 379/88 |
| 5,572,570 | 11/1996 | Kuenzig | 379/1 |
| 5,583,919 | 12/1996 | Talvard et al. | 379/67 |
| 5,594,784 | 1/1997 | Velius | 379/88 |

* cited by examiner

Primary Examiner—Jack Chang
(74) Attorney, Agent, or Firm—Henderson & Sturm LLP

(57) ABSTRACT

A remotely controlled speaker phone actuated by an infrared remote control. The housing for the phone includes three angularly disposed front surfaces, each surface carrying speakers, microphones, and an infrared sensor. The infrared remote control is used to actuate the phone from any location in the room where the phone is located. Speaker volume control and speed dialing of preset numbers including 911 are also provided on the remote control. The phone may be wall-mounted, or it may be carried on a mobile base. The remote control may be attached to a key chain or wristband so that it will always be readily accessible to the user.

4 Claims, 1 Drawing Sheet

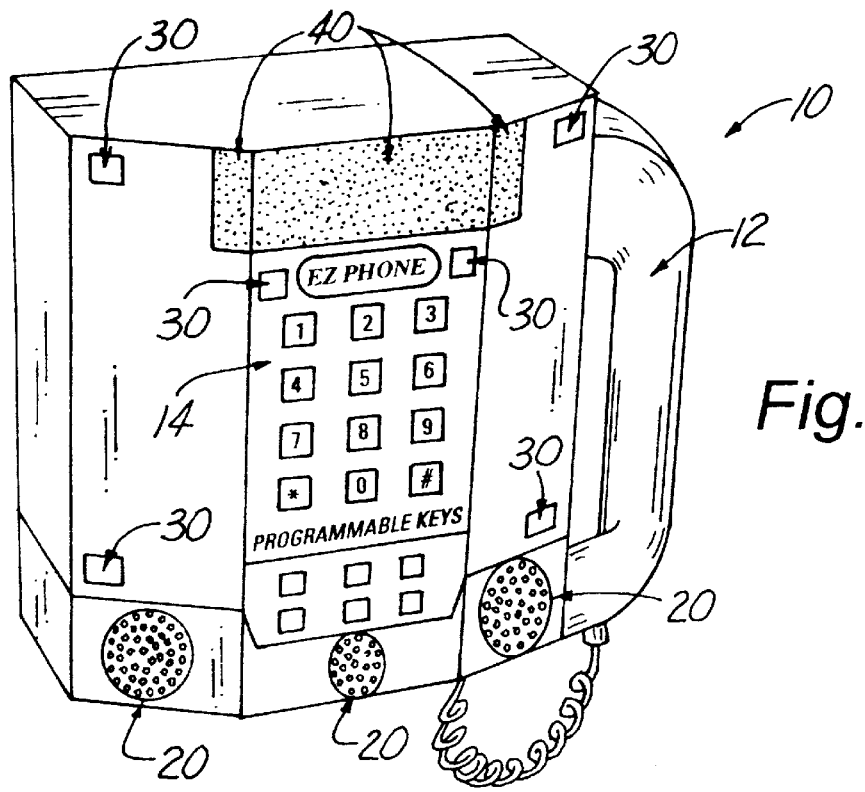
Fig. 1
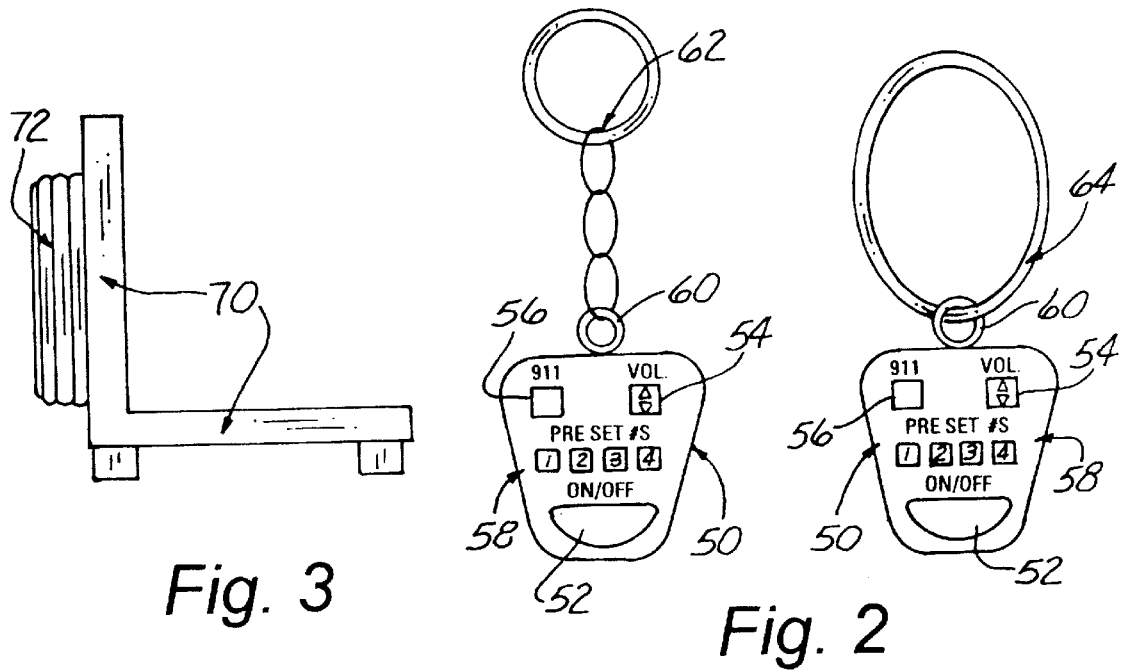
Fig. 3
Fig. 2

REMOTELY CONTROLLED SPEAKER PHONE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of telephone devices, and more particularly to a remotely controlled speaker phone.

2. Description of Related Art

As can be seen by reference to the following U.S. Pat. Nos. 5,224,153; 5,228,075; 5,566,229; 5,572,570; 5,583,919 and 5,594,784, the prior art is replete with myriad and diverse telephone devices.

While all of the aforementioned prior art constructions are more than adequate for the basic purpose and function for which they have been specifically designed, they are uniformly deficient with respect to their failure to provide a simple, efficient and practical remotely controlled speaker phone.

As a consequence of the foregoing situation, there has existed a longstanding need for a new and improved remotely controlled speaker phone and the provision of such a construction is a stated objective of the present invention.

BRIEF SUMMARY OF THE INVENTION

Briefly stated, the present invention provides a remotely controlled speaker phone actuated by an infrared remote control. The housing for the phone includes three angularly disposed front surfaces, each surface carrying speakers, microphones, and an infrared sensor. The infrared remote control is used to actuate the phone from any location in the room where the phone is located. Speaker volume control and speed dialing of preset numbers including 911 are also provided on the remote control. The phone may be wall-mounted, or it may be carried on a mobile base. The remote control may be attached to a key chain or wristband so that it will always be readily accessible to the user.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the remotely controlled speaker phone of the present invention;

FIG. 2 is a front elevational view showing two remote control boxes, one attached to a key chain and one attached to a wristband; and FIG. 3 is a side elevational view of a mobile base that may be used for the speaker phone.

DETAILED DESCRIPTION OF THE INVENTION

As can be seen by reference to the drawings, and in particularly to FIG. 1, the remotely controlled speaker phone forms the basis of the present invention is designated generally by the reference number 10.

The phone 10 is a redesigned speaker phone having normal features such as a handset 12 and numbered buttons 14 with the addition of additional built-in speakers 20, microphones 30, and infrared sensors 40 serving to receive signals from a remote control transmitter 50. The front of the phone 10 has a trapezoidal shape, and each of three sides of the trapezoid has it's own speaker 20 and microphone 30, and infrared sensor 40, allowing the user to easily speak to and hear the phone 10 from any location in the room. The remote control transmitter unit 50 is lightweight, waterproof and features a button 52 allowing one to answer and hang up the phone, a button 54 to adjust the speaker volume, a button 56 to dial 911, and buttons 58 to dial up to four pre-set numbers by remote control 50. The remote 50 has a loop 60 allowing a key chain 62 or wristband 64 to be attached. Phone 10 also features a mobile base stand 70 with a wind-up cord 72 on the back, allowing the user to move the base unit 70 to any location they desire. The design of the phone 10 allows it to be used on the base stand 70 or attached to a wall in the fashion of a standard wall phone.

The phone 10 is a standard type speaker phone with the addition of having extra microphones 30, speakers 20, and a remote control 50, allowing the user to answer the phone 10 from almost anywhere in the room without walking over to pick up the receiver. The remote 50 has programmable preset numbers allowing the user to dial important or emergency numbers by pressing a single button on the remote 50.

In use, the user simply connects the phone 10 to their phone line and enjoys the benefit of having a phone which can be answered from anywhere in the room by merely pressing the on/off button 52 on the remote 50. The multi-directional speakers 20 and microphones 30 would allow the user to both hear, and be heard, even when to the side of the phone 10. The remote volume control 54 allows the user to adjust the speaker volume as desired. In the event that the user desires to dial 911, or one of four pre-set numbers, they would merely push the on/off button 52 and depress the applicable pre-set number button 56, 58. Use of the phone 10 is a very practical and convenient method of allowing anyone to answer a phone or make a call hands free, without the need to move from their location. The phone 10 is especially beneficial to one who may be disabled, handicapped or bedridden.

The phone 10 is a telephone which allows versatility and flexibility for everyone. It can be used in the home, workplace and at recreational activities. The phone 10 is particularly beneficial for those who may be disabled or bedridden. It consists of the phone 10 itself, a base 70, and a remote 50 which allows a key chain 62 or wristband 64 attachment. The remote 50 is compact, lightweight and waterproof. The unit is easy to use with little to no instruction, which makes it very user friendly to both small children and adults. The system allows for remote usage, hands free operation and easy accessability. The phone 10 eliminates the hassle associated with trying to answer the phone at inconvenient times and in emergency situations.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A remotely controlled speaker phone system, comprising:
   a housing including three angularly disposed front surfaces, each of the three surfaces carrying speakers, microphones, and an infrared sensor; and
   an infrared transmitting remote control, the remote control being operable to answer and terminate incoming calls, initiate outgoing calls to pre-set numbers, and adjust the volume of the speakers.

2. The phone system of claim 1 wherein the housing is carried on a mobile base positionable at any desired location within a room.

3. The phone system of claim 1 wherein the remote control is attached to a key chain carried by a user.

4. The phone system of claim 1 wherein the remote control is attached to a wristband worn by a user.

* * * * *